Feb. 11, 1969 — J. MALONEY — 3,426,418
METHOD OF ASSEMBLING DOOR MEMBERS
Filed Oct. 12, 1966
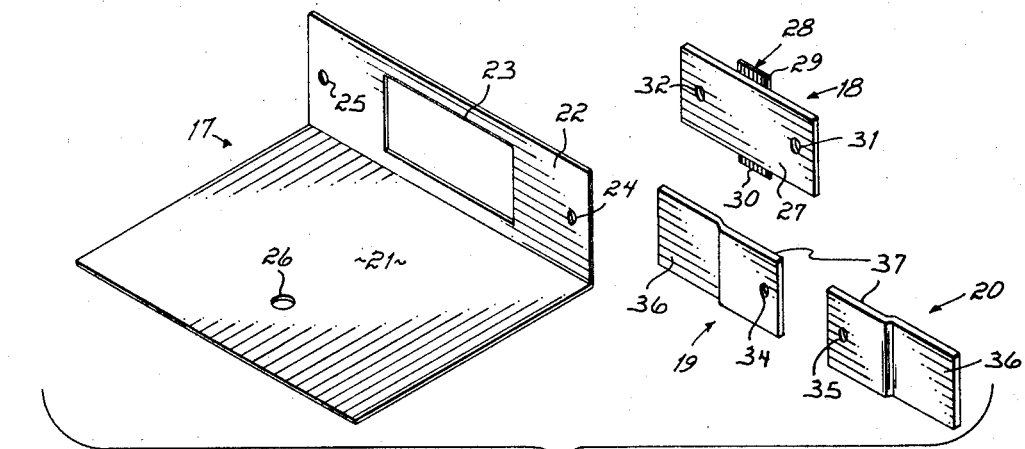
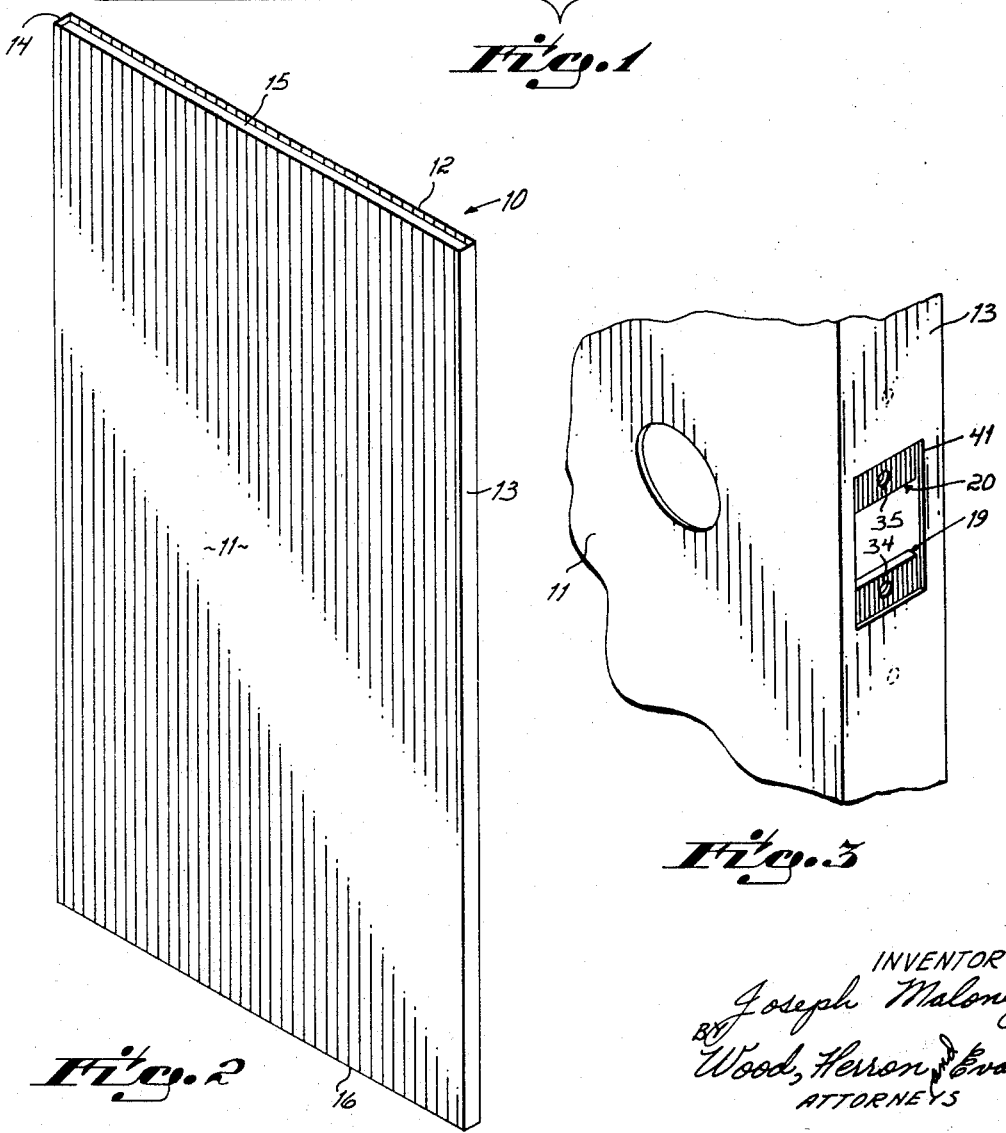
INVENTOR
Joseph Maloney
BY Wood, Herron & Evans
ATTORNEYS

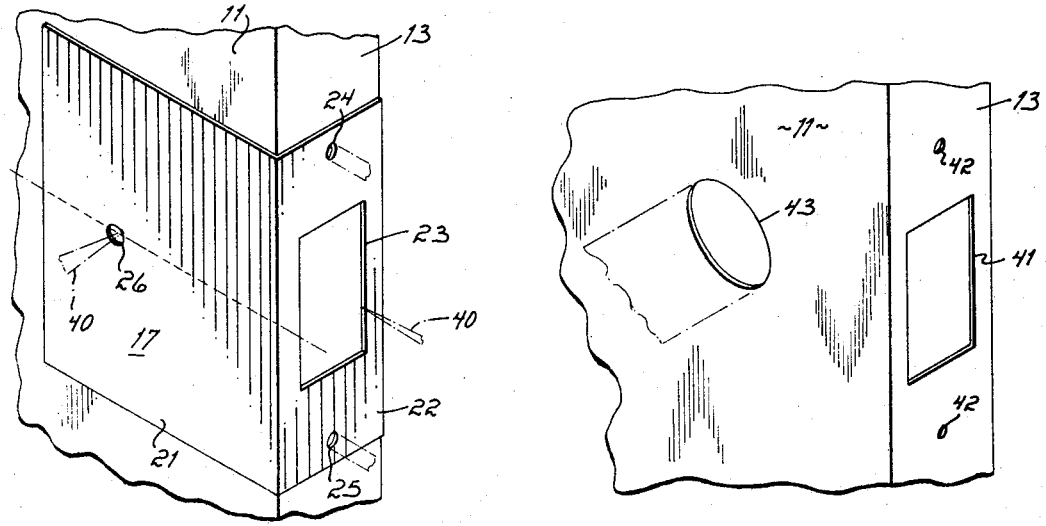
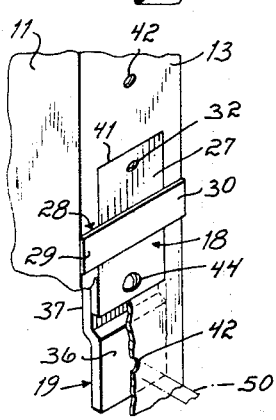
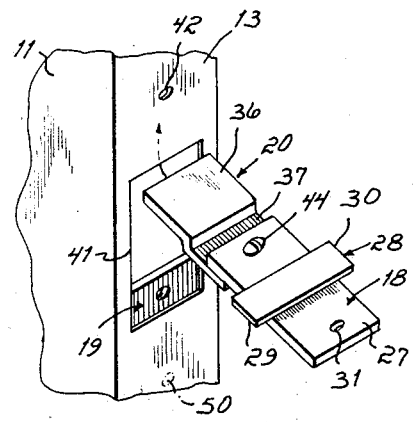
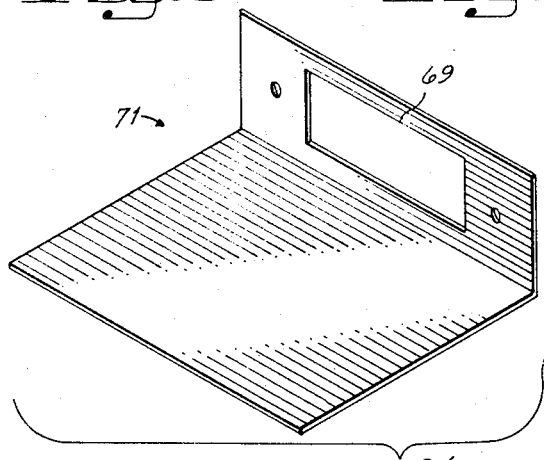
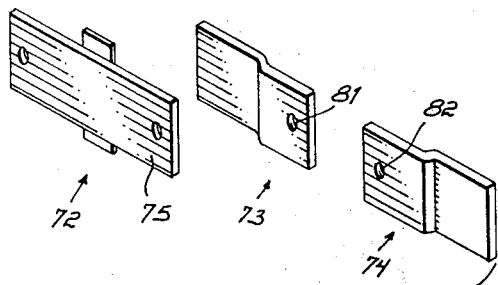

Feb. 11, 1969  J. MALONEY  3,426,418
METHOD OF ASSEMBLING DOOR MEMBERS
Filed Oct. 12, 1966  Sheet 3 of 5

INVENTOR
Joseph Maloney
BY
Wood, Herron & Evans
ATTORNEYS

Feb. 11, 1969    J. MALONEY    3,426,418
METHOD OF ASSEMBLING DOOR MEMBERS
Filed Oct. 12, 1966    Sheet 4 of 5

INVENTOR
Joseph Maloney
BY
Wood, Herron & Evans
ATTORNEYS

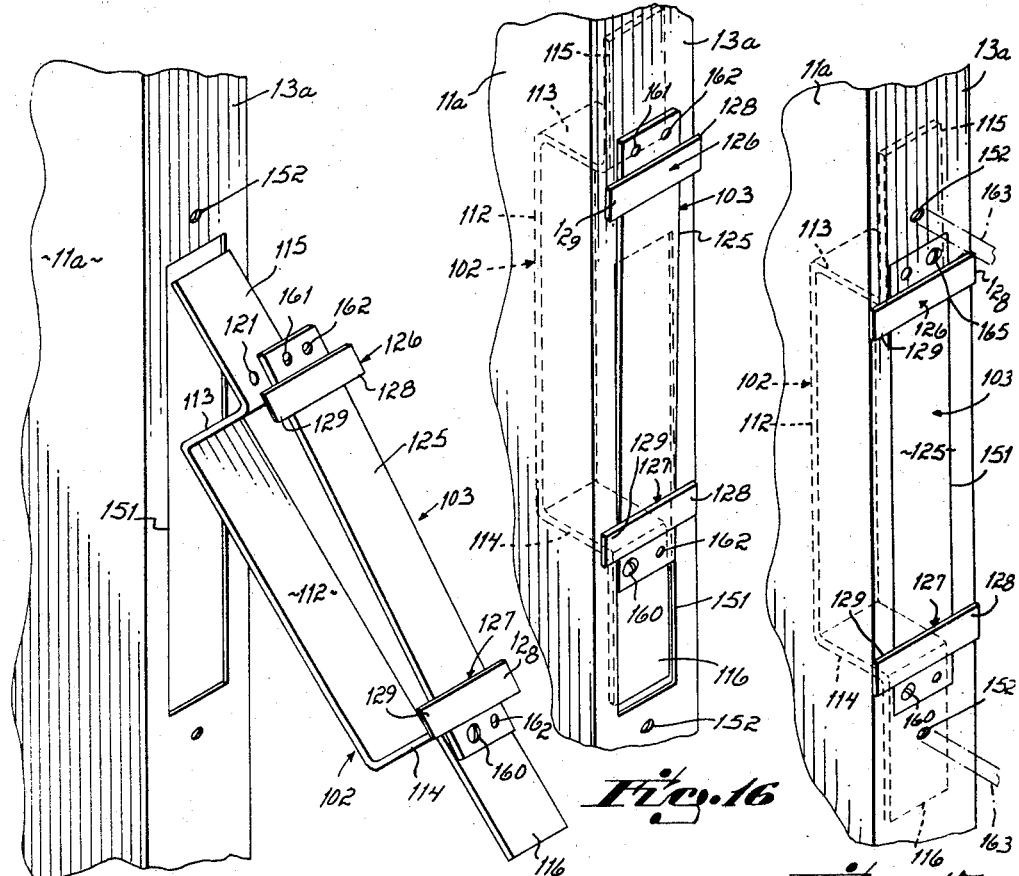
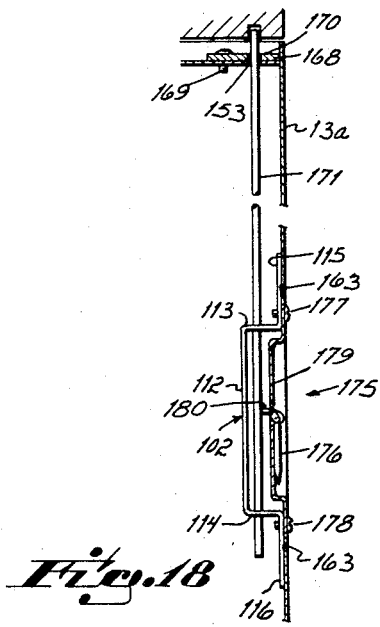

United States Patent Office 3,426,418
Patented Feb. 11, 1969

3,426,418
METHOD OF ASSEMBLING DOOR MEMBERS
Joseph Maloney, Cincinnati, Ohio, assignor to The Steelcraft Manufacturing Company, Rossmoyne, Ohio, a corporation of Ohio
Filed Oct. 12, 1966, Ser. No. 586,062
U.S. Cl. 29—407   8 Claims
Int. Cl. B23q 3/00, 17/00; E05b 17/06

The invention relates to a method of assembling hollow metal doors.

It has been an objective of this invention to provide a method of fitting a standard style of hollow metal door with various differing types of hardware for different applications.

The practice of the metal door industry has been to supply numerous different styles or types of doors to distributors to accommodate different types of hardware, such as different types of locks, handles, etc. This practice has been dictated by the different mounts required to accommodate different types of locks, handles or fixtures. It has always been cheaper and less expensive to supply different styles of doors than to supply a single style door and then attempt to modify it in the field.

The primary objective of this invention has been to provide a method of enabling relatively unskilled laborers to inexpensively modify a standard blank metal door to accommodate different styles or types of hardware in a way which completely disguises the fact that the door was not completed at the factory. This invention thus enables a manufacturer to supply a single style door to the distributors together with the equipment to inexpensively modify the door to accommodate different types of hardware so that the distributor has available a full line of doors even though he has on hand only a small inventory of standard door blanks.

The primary advantage of this invention is that it enables distributors to stock a complete line of doors while maintaining a relatively small inventory of a single style door in differing sizes together with a series of relatively inexpensive assembly kits which enables the doors to be modified to accommodate different types of hardware. Thus the distributors may eliminate the large inventory they have heretofore been required to carry in order to have available a complete line of doors.

Figure 10:
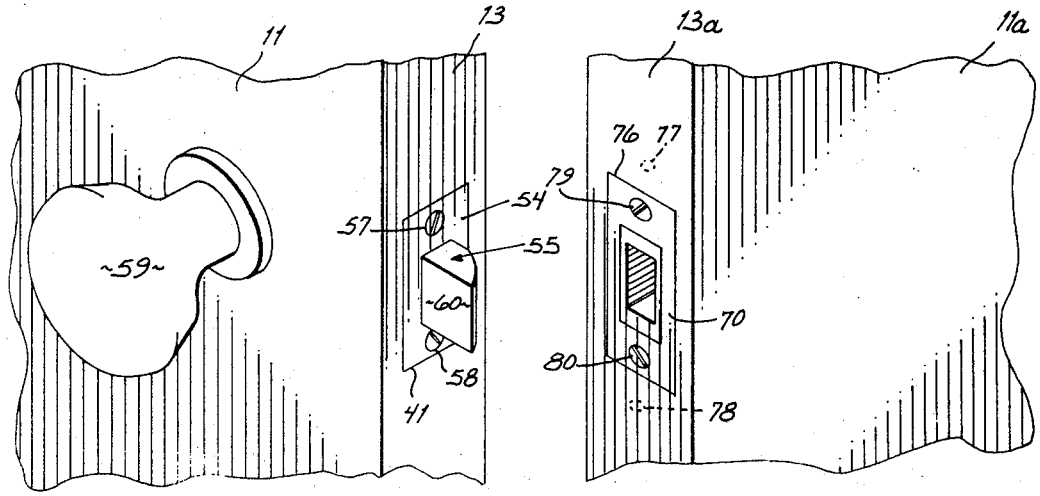
Figure 11:
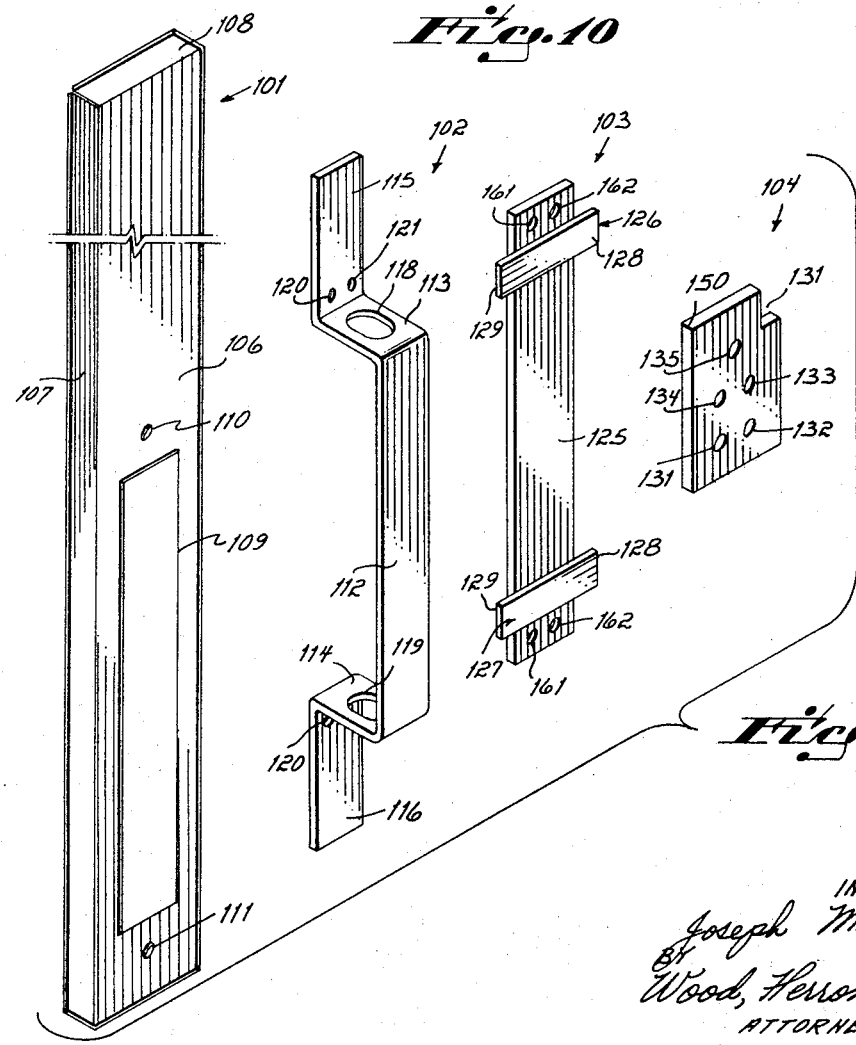
Figure 12:
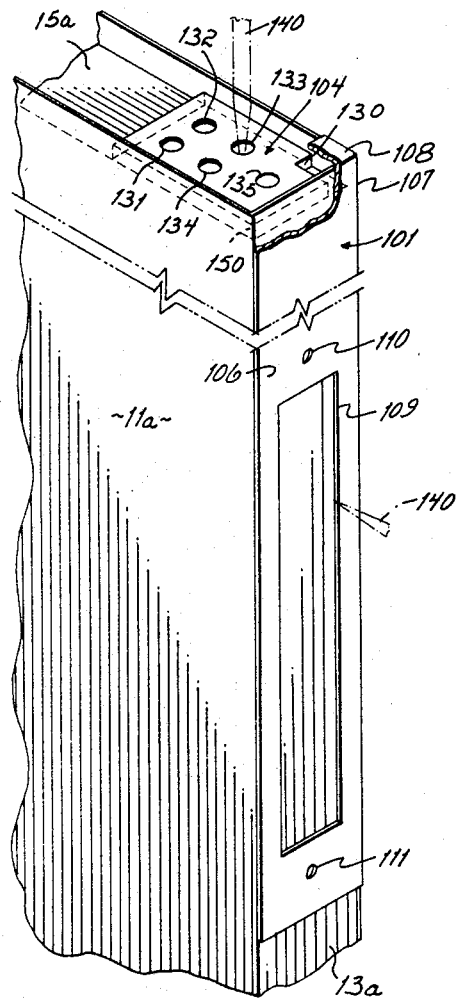
Figure 14:
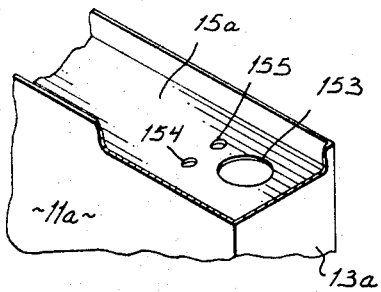
Figure 13:
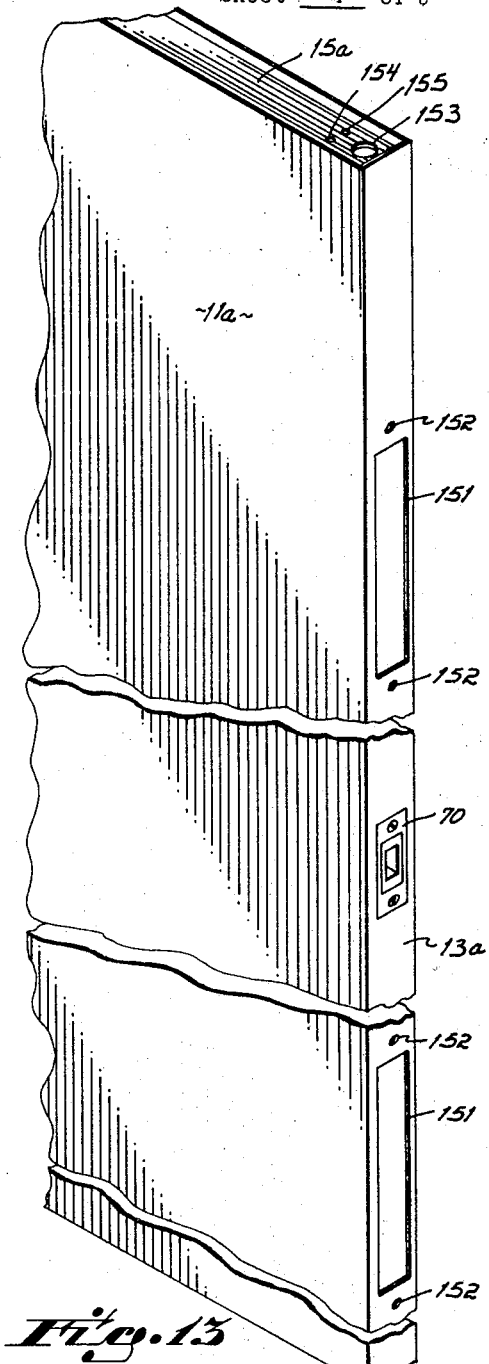

These and other objects and advantages of this invention will be more readily apparent from the following description of the drawings in which:

FIGURE 1 is a perspective view of a dead bolt lock assembly kit including the template, mounting fixture, and a pair of mounting brackets, FIGURE 2 is a perspective view of a standard hollow metal door or blank of the type to which the invention of this application pertains, FIGURE 3 is a perspective view of a portion of the door of FIGURE 2 modified to accommodate a dead bolt lock, FIGURE 4 is a perspective view of the template of FIGURE 1 applied to a door, FIGURE 5 is a perspective view of the apertured door after it has been cut in accordance with the lines of demarcation of the template, FIGURE 6 is a perspective view, partially broken away, of a door and a mounting bracket attached to a mounting fixture located therein, FIGURE 7 is a perspective view of a portion of the door illustrating the manner of placement of the mounting bracket and fixture in the door, FIGURE 8 is a perspective view of a door after the mounting brackets for a dead bolt lock have been secured therein, FIGURE 9 is a perspective view of a striker plate mounting kit including a template, a locating fixture, and a pair of mounting brackets, FIGURE 10 is a perspective view of a pair of double doors fitted with a dead bolt lock and a striker plate in accordance wtih the invention of this application, FIGURE 11 is a perspective view of a flush bolt mounting kit including a template, mounting bracket, locating fixture and locating jig, FIGURE 12 is a perspective view of a door on which is mounted a flush bolt lock mounting template and locating jig, FIGURE 13 is a perspective view, partially broken away, of a door apertured to accommodate a pair of flush bolt locks, FIGURE 14 is an enlarged perspective view, partially broken away, of the top corner of the door of FIGURE 13, FIGURE 15 is a perspective view of a portion of the door in FIGURE 13 illustrating the manner of assembling a mounting bracket on the interior of the door, FIGURE 16 is a perspective view of the door of FIGURE 13 having the mounting bracket partially located therein, FIGURE 17 is a perspective view of the door of FIGURE 13 with the mounting bracket centered in the door and held in place by the locating fixture, and FIGURE 18 is a cross-sectional view of a door having a flush bolt lock mounted therein in accordance with the invention of this application.

Referring first to FIGURE 2, there is illustrated a hollow metal door or blank 10 of the type to which the invention of this application pertains. This door 10 comprises a front plate 11 and rear plate 12, a pair of side plates 13, 14, a top plate 15 and bottom plate 16, all of which are welded together to form a hollow sheet metal door. The door in exactly this form is supplied to a distributor who then modifies it according to the invention of this application to accommodate the various fixtures and items of hardware required for ultimate use.

Referring now to FIGURE 1, there is illustrated an assembly kit to be utilized in mounting one item of hardware, a dead bolt lock, on the hollow door. This kit comprises a right angle corner template 17, a mounting fixture 18, and a pair of mounting brackets 19 and 20.

The right angle corner template 17 is made from sheet metal bent at 90° to define two rectangular sections 21, 22. One section 22 has a large rectangular aperture 23 centrally located therein together with a pair of small circular apertures 24 and 25 located on opposite sides of the rectangular aperture 23. The other section 21 has a single circular aperture 26 therein.

The mounting fixture 18 comprises a locating plate 27 on one side of which a stop bar 28 is welded. The locating plate 27 is a rectangular strip of sheet metal, slightly smaller but of the same planar configuration as the aperture 23 in the corner template 17. The stop bar 28 is located at the longitudinal center of the locating plate 27 and has its end sections 29 and 30 extending beyond the lateral edges of the plate 27. A pair of circular apertures 31, 32 are located adjacent the opposite ends of the locating plate 27.

Each of the mounting brackets 19 and 20 comprises a relatively long, narrow rectangular strip of metal having a threaded aperture 34, 35, respectively, located adjacent one longitudinal end of the bracket. Approximately midway in the length of each bracket, it is offset transversely so that one end section 36 of each bracket is laterally offset from the plane of the opposite end section 37, the offset being approximately equal to the thickness of the metal bracket.

Referring now to FIGURES 4 and 5, it will be seen that the door 10 to be fitted with a dead bolt is first apertured to accommodate the dead bolt lock mounting brackets 19 and 20. To properly locate the apertures, the template 17 is fitted over a vertical edge of the door with the rectangularly apertured section 22 being located in abutment with one side of the door and the other section 21 located in abutting relation with the front plate 11. When the template is properly located at a preselected distance from the top edge of the door, a scribe 40, shown in phantom in FIGURE 4, is used to demark the proper location of the door knob aperture 43 and the door lock aperture 41 by circumscribing the circular aperture 25 of the corner template 17, and the rectangular aperture 23. Additionally, the side 13 of the door is drilled at the location of the template holes 24 and 25 to provide apertures 42–42. After all of the template apertures have been circumscribed on the door, the template is removed and the door is cut along the scribed lines. Thus a rectangular aperture 41 is cut in the side of the door with a paire of holes 42–42 located above and below the rectangular aperture 41. Additionally, the large circular aperture 43 is cut in the door on the center demarked by the aperture 26 in the template.

In order to have a smooth exterior door, the mounting brackets must be mounted interiorly of the hollow door 10. To this end, a single bracket 19 is first bolted to the mounting fixture 18 in the manner shown in FIGURE 7. This is accomplished by inserting a threaded screw 44 through the aperture 31 of the fixture and threading it into the threaded aperture 34 of the bracket 19. With the bracket 19 secured to the fixture 18, the bracket is inserted through the rectangular aperture 41 of the door and the attached flat locating plate 27 of the fixture 18 is located within the aperture 41, to which it conforms in shape. As may be seen in FIGURE 6, the locating plate 27 is held at this time against falling into the interior of the door by the abutment bar 28, the ends 29 and 30 of which abut against the exterior of the door. When the mounting bracket 19 and attached fixture 18 are thus located in the door, the flat end section 36 of the bracket 19 abuts against the interior of the side plate 13 of the door. While the bracket 19 is retained in this position by the fixture 18, a plug weld (indicated in phantom by the numeral 50 in FIGURE 6) is used to fill the hole 42 and secure the bracket 19 to the side plate 13 of the door. Thereafter, the fixture 18 is removed from the aperture 41 and the mounting bracket is left secured to the interior of the door by the plug weld.

Next, the other mounting bracket 20 is removably secured to the mounting fixture 18 by means of the screw 44 which is inserted through the aperture 32 of the fixture and threaded into the threaded aperture 35. The bracket 20 is then inserted through aperture 41 of the door as shown in FIGURE 7 and the locating plate 27 of the fixture 18 is again centered within the hole 41 of the door. At this time the bracket 20 is held in place by the fixture with the offset end section 36 resting against the interior of the side 13 of the door. The hole 42 is then filled by a plug weld so as to secure the mounting bracket 20 to the interior of the door. The mounting fixture is then released from the bracket 20 by removal of the screw 44 and the fixture is removed from the door aperture 41. The plug welds may then be ground smooth and the door painted and finished.

To mount a dead bolt lock in the door, the lock is inserted through the aperture 41 between the two mounting brackets 19 and 20 until the front plate 54 of the lock 55 is flush with the exterior of the side 13 of the door. The plate 54 may then be attached to the mounting brackets 19 and 20 by screws 57, 58 threaded into the threaded apertures 34, 35 of the brackets 19 and 20 respectively. The door knob 59 of the lock is then inserted through the aperture 43 and attached to the lock mechanism in the conventional manner so as to control movement of the bolt 60 of the lock 55.

By following the method heretofore taught, and by using the kit illustrated in FIGURE 1, a standard hollow metal door or blank 10 may easily be fitted with a dead bolt lock 55 by a distributor located in the field away from the place of manufacture of the door. In this way, a manufacturer may supply a standard unfinished door to his distributors and his distributors may then attach a dead bolt or any other standard type of lock to the door for ultimate use. In this way the inventory required for a distributor is substantially reduced as well as the cost which the distributor would otherwise have to pay for a full line of doors.

Referring to FIGURE 9, there is illustrated an assembly kit for attaching a striker plate 70 (FIGURE 10) to a hollow metal door. This kit is very similar to that illustrated in FIGURE 1 for mounting a dead bolt on a door. Specifically, it includes a right angle corner template 71 that includes a rectangular aperture 69, a locating fixture 72, and a pair of mounting brackets, 73, 74. The template 71 is identical to the template 17 except for the difference in the size rectangular apertures 69 and 23. Aperture 69 is for a striker plate and is generally longer than the aperture 23 for a dead bolt lock. Additionally, there is no door knob centering hole in the template 71.

The locating fixture 72 is identical to the fixture 18 except for the difference in size between the locating plate 27 and the locating plate 75. The locating plate 75 corresponds in shape and size to the rectangular aperture 69. The brackets 73 and 74 are identical to the brackets 19 and 20 and include tapped holes 81, 82 respectively.

To attach a striker plate 70 to a door so that the exterior surface of the plate 70 is flush with the exterior surface of the side 13a of the door 10a, the template 71 is first mounted over the door 10a in the same fashion that the template 17 was mounted over the door 10 and is used to locate the scribed lines demarking a rectangular aperture 76 and a pair of welding apertures 77 and 78. Thereafter, the rectangular aperture 76 is cut from the door along the scribed line and holes are drilled in the door at the location of the scribed circles 77 and 78. One of the brackets 73 is then attached to the mounting fixture 71 by a screw (not shown) and inserted through the aperture 76 into the interior of the door. When the locating plate 75 of the fixture 72 is properly centered in the aperture 76, one surface of the mounting bracket 73 abuts the inside surface of the side plate 13a in the vicinity of the aperture 77 so that a plug weld may be used to fill the aperture 77 and attach the bracket 73 to the interior of the side 13a of the door. Similarly the bracket 74 is attached to the inside of the door by a plug weld in the aperture 78. After both brackets have been secured in place on the interior of the door, the locating fixture 72 is removed and the flush plate 70 is secured in place by a pair of screws 79 and 80 threaded into the threaded apertures 81 and 82 of the brackets 73 and 74, respectively. When properly attached to the brackets, the exterior surface of the striker plate 70 is located in a common plane with the exterior surface of the side 13a of the door 10a.

Referring now to FIGURES 12 through 18, there is illustrated a method of assembling a flush bolt lock upon the hollow steel door 10a. The assembly kit for practicing this method is illustrated in FIGURE 11 and comprises a template 101, a mounting bracket 102, a mounting fixture 103, and locating jig 104.

The template 101 comprises a front plate 106 from which is bent at 90° a side locating plate 107 and a top locating plate 108. The front plate 106 has a relatively long rectangular aperture 109 located adjacent the lower end thereof as well as a pair of circular apertures 110 and 111 spaced longitudinally from the opposite ends of the rectangular aperture 109.

The bracket 102 is generally U-shaped and comprises a central vertical web section 112, a pair of horizontal leg sections 113 and 114 located at the opposite ends of the vertical section 112, and a pair of vertically extending flange sections 115, 116 located at the ends of the horizontal leg sections 113 and 114 respectively. The horizontal legs 113 and 114 are provided with coaxial apertures 118 and 119 and each of the vertical flange sections 115 and 116 is provided with a pair of threaded apertures 120, 121 located adjacent the horizontal section 113 and 114 of the bracket 102.

The locating fixture 103 comprises a long, narrow rectangular locating plate 125 to one side of which a pair of transverse stop bars 126, 127 are welded. The ends 128 and 129 of the stop bars 126 and 127 extend beyond the side edges of the locating plate 125 so that they may serve as abutments when the locating plate 125 is fitted into a correspondingly sized and shaped aperture of the door as is explained more fully hereinafter. A pair of apertures 161, 162 are positioned between each of the bars 126, 127 and the ends of the plate 125.

The locating jig 104 is generally rectangular in shape but has one corner recessed or cut away to define a notch 130. There are five small circular holes in the jig 104, four of which 131, 132, 133 and 134 are spaced apart in the configuration of a square and the fifth 135 of which is located on the longitudinal center line of the jig adjacent to notch 130.

Generally, flush bolts are mounted at both the top and bottom of a door so that the bolts may be extended from the door into both the top and bottom door jambs. While it is anticipated that the invention of this application will be used to mount both a top and bottom flush bolt lock on a door 10a, the invention has been illustrated only in the mounting of a single flush bolt lock adjacent to the top edge of the door. It should be appreciated, however, that the same procedure would be followed in mounting a similar flush bolt lock at the bottom of the door.

Referring to FIGURE 12, it will be seen that the door 10a is prepared for mounting of a flush bolt by first cutting apertures in the door to accommodate the flush bolt lock. To this end, the template 101 is first located over the top edge of the door with the front plate 106 placed in juxtaposition against the side 13a of the door. The side 107 of the template is then placed in abutment against the rear side of the door and the top flange 108 is placed in abutment against the top edge of the door. This properly locates the apertures 109, 110 and 111 of the template 101 relative to the door, and a scribing tool, indicated at 140, is utilized to demark the edges of a rectangular aperture and a pair of circular apertures to be cut in the door at a location corresponding to the location of the rectangular aperture 109 and the apertures 110 and 111 of the template.

The jig 104 is next fitted into the recessed top of the door between the front plate 11a, the rear plate 12a, and the recessed top wall 15a. When properly positioned, the unnotched corner 150 of the jig is tightly fitted into one corner at the top of the door which thus positions the holes 131-135 of the jig relative to that corner. The scribing tool 140 is then used to demark the location of the holes 131-135 of the jig on the top 15a of the door.

After the location of the apertures have all been properly demarked on the door, the template 101 and jig 104 are removed and apertures are cut in the door at the location of the scribed lines. Specifically, a rectangular aperture 151 is cut in the door at the previous location of the aperture 109 of the template and a pair of holes 152-153 are drilled in the side of the door 13a at the previous location of the template holes 110, 111. An aperture 153 is drilled in the top 15a of the door on the center line demarked by the aperture 135 of the jig 104. At least two holes 154, 155 are drilled in the top of the door on the center lines of two of the holes 131-135. A reinforcing plate 168 is mounted in the recess on the top 15a of the door as is explained more fully hereinafter.

In order to secure the mounting bracket 102 on the interior of the door, the locating fixture 103 is first secured at one end to the bracket 102 by inserting a screw 160 through one aperture 161 of the locating fixture 103 and threading it into one of the threaded holes 121 of the mounting bracket. The screw 160 is not tightened at this point but is left sufficiently loose that the fixture may be moved relative to the mounted bracket. At this time, the mounting fixture extends across the open web portion 112 of the mounting bracket 102 and because the screw 160 has not been tightened, the end of the mounting fixture opposite from the screw may be spaced from the flanged end section 115 of the mounting bracket as may be seen in FIGURE 15. With the fixture and bracket in this position, the end flanged section 115 of the mounting bracket is inserted upwardly into the rectangular aperture 151 of the door until the side 13a of the door passes between the end flange 115 and the adjacent end of the locating fixture 103. The mounting bracket and attached fixture are then raised into the position illustarted in FIGURE 16 in which the lower end flange 116 of the mounting bracket passes through the lower end of the rectangular aperture 151. At this time, the ends 128, 129 of the transverse straps 126, 127 attached to the locating fixture 103 abut against the side 13a of the door and preclude the mounting bracket 102 and attached fixture 103 from falling into the hollow interior of the door.

After the lower end flange section 116 of the mounting bracket has been passed through the aperture 151 into the interior of the door, the locating fixture and attached bracket are lowered until the locating plate 125 of the locating fixture 103 is centered within the rectangular aperture 151. When thus centered in the aperture, the outer surface of the locating fixture is located in the plane of the outer surface of the side of the door, and the mounting bracket is located completely within the interior of the door as illustrated in FIGURE 17.

At this time a second screw 165 is inserted through one of the apertures 161 or 162 of the fixture 103 at the opposite end from the screw 160, and both screws are tightened so as to draw the end flanged sections 115 and 116 of the mounting bracket into tight engagement with the inside surface of the side 13a of the door 10a. The end flanged sections 115 and 116 of the mounting bracket are then welded in place by a plug weld, as at 163, through the apertures 152—152 in the side of the door. With the mounting bracket permanently secured in place on the inside of the door by the plug weld, the locating fixture 125 is then removed and the door finished by grinding off the plug welds 163 flush with the exterior of the door and thereafter painting the door.

A flush bolt lock is mounted in the door by first attaching the reinforcing plate 168 to the top corner of the door by screws 169 threaded into the threaded apertures 154 and 155. An aperture 170 of the mounting plate 168 is then coaxially aligned with the aperture 153 in the top of the door so that a flush bolt 171 may be inserted through the apertures 170, 153 in the top of the door and through the apertures 118 and 119 of the mounting bracket. A conventional flush bolt actuating mechanism 175 including a flush bolt control lever 176 may then be mounted in the aperture 151 of the door and secured therein by screws 177, 178 threaded into the threaded apertures 120, 121 of the mounting bracket. When secured within the aperture 151 of the door, the exterior surface of the flush bolt lock mounting plate 179 is located in the plane of or flush with the exterior surface of the side 13a of the door and a link 180 of the flush bolt lock mechanism interconnects the flush bolt 171 with the control lever 176 so that actuation of the lever 176 causes the bolt 171 to be extended or retracted.

The invention of this application provides a very simple method and apparatus for mounting different types of lock mechanisms flush with the exterior surface of a door so as to enable the door to be assembled in the field by relatively unskilled workmen.

The primary advantage afforded by this invention is that it enables a manufacturer to supply a standard hollow metal door to his distributors who may then fit different types of locks or assemblies upon the door in a professional manner and at a minimum of expense. Manifestly, this reduces the distributor's inventory and the ultimate cost of the doors to the consumer.

While only three specific embodiments of mounting kits and lock mechanisms have been disclosed and described herein, those skilled in the art to which this invention pertains will readily appreciate numerous other changes and modifications which may be made without departing from the spirit of the inventive method and apparatus described herein. Therefore, I do not intend to be limited except by the scope of the appended claims.

Having described my invention, I claim:

1. A method of assembling a hollow sheet metal door which comprises the steps of:
   positioning a template over a side of the door to locate a lock aperture,
   cutting an aperture in the door in the position demarked by the template,
   attaching a mounting element to a locating fixture,
   locating said fixture in said aperture so as to position the attached mounting element within the hollow interior of said door,
   securing said mounting element to said door on the interior thereof while said mounting element is held in place by said fixture,
   removing said fixture from said mounting element after it has been secured to said door, and
   attaching an element of a door lock to said mounting element.

2. The method of claim 1 wherein said element of a door lock comprises the front plate of a deadbolt lock, the front face of said front plate being located flush with the said side of the door when attached to said mounting element.

3. The method of claim 1 wherein said element of a door lock comprises a stricker plate of a lock mechanism, the front surface of said plate being located flush with the said side of the door when attached to said mounting element.

4. The method of claim 1 wherein said element of a door lock comprises a flush bolt mounting plate, the exposed face of said flush bolt mounting plate being located in a common plane with the said side of the door.

5. A method of assembling a hollow sheet metal door which comprises the steps of:
   positioning a template over a side of the door to locate a lock aperture,
   cutting an aperture in the door in the position demarked by the template,
   attaching a mounting element to a locating fixture,
   locating said fixture in said aperture so as to position the attached mounting element within the hollow interior of said door,
   welding said mounting element to said door on the interior thereof while said mounting element is held in place by said fixture,
   removing said fixture from said mounting element after it has been welded to said door, and
   attaching an element of a door lock to said mounting element.

6. A method of assembling a hollow sheet metal door which comprises the steps of:
   cutting an aperture in one side of the door,
   attaching a mounting element to a locating fixture,
   locating said fixture in said aperture so as to position the attached mounting element within the hollow interior of said door,
   welding said mounting element to said door on the interior thereof while said mounting element is held in place by said fixture,
   removing said fixture from said mounting element after it has been welded to said door, and
   attaching an element of a door lock to said mounting element.

7. The method of assembling a hollow metal door which comprises the steps of:
   cutting an aperture in a side of the door,
   attaching a locating fixture to a generally U-shaped mounting bracket, one end of said fixture being attached to one end of said U-shaped bracket and the opposite end of said fixture being located near but spaced from the opposite end of said bracket,
   inserting said opposite end of said bracket through said aperture into said hollow interior of said door and thereafter moving said bracket in one direction longitudinally of said door until said side edge of said door is located between said opposite end of said fixture and said opposite end of said bracket,
   inserting said one end of said bracket through said aperture while said side of said door is located between said opposite end of said bracket and said opposite end of said fixture, said fixture having strips thereon operative to prevent said fixture from entering said aperture,
   moving said fixture and attached bracket longitudinally of said door in a direction opposite said one direction until said fixture is centered in said aperture,
   attaching said opposite end of said fixture to said opposite end of said bracket while said fixture is centered in said aperture to locate said bracket relative to said side wall of said door,
   welding said bracket to the inside surface of said side of said door while said bracket is held in place relative to said aperture by said fixture, and
   removing said fixture after said bracket is secured to said door.

8. The method of claim 7 further comprising the step of securing an element of a door lock to said bracket after removal of said fixture, said door lock element having an exposed surface at least a portion of which is located in a common plane with the exposed surface of said side of said door.

References Cited

UNITED STATES PATENTS

| | | | |
|---|---|---|---|
| 292,463 | 1/1884 | Bassett | 33—197 |
| 2,775,812 | 1/1957 | Mohr | 29—407 |
| 1,784,238 | 12/1930 | Kennedy | 29—464 |
| 2,832,381 | 4/1958 | Sherwood | 33—197 X |
| 3,057,053 | 10/1962 | Schlage | 29—407 |
| 3,102,447 | 9/1963 | Gregory et al. | 29—468 X |
| 3,113,600 | 12/1963 | Hillgren | 33—197 X |

CHARLIE T. MOON, *Primary Examiner.*

U.S. Cl. X.R.

29—283, 468; 70—466; 33—197